(12) United States Patent
Soffer

(10) Patent No.: US 7,499,504 B2
(45) Date of Patent: Mar. 3, 2009

(54) METHOD FOR DETERMINING MULTIPLE-INPUT MULTIPLE-OUTPUT (MIMO) CHANNEL COEFFICIENT USING POLARITY-INVERTED TRAINING SIGNALS IN AN ORTHOGONAL FREQUENCY DIVISION MULTIPLEXED (OFDM) MULTICARRIER SYSTEM

(75) Inventor: Menashe Soffer, Katzir (IL)

(73) Assignee: Intel Corporation, Santa Clara, CA (US)

( * ) Notice: Subject to any disclaimer, the term of this patent is extended or adjusted under 35 U.S.C. 154(b) by 622 days.

(21) Appl. No.: 11/122,268

(22) Filed: May 4, 2005

(65) Prior Publication Data

US 2006/0251183 A1 Nov. 9, 2006

(51) Int. Cl.
*H04L 27/00* (2006.01)
*H04L 27/28* (2006.01)

(52) U.S. Cl. .................. 375/316; 375/295; 375/147; 375/260

(58) Field of Classification Search .......... 375/295, 375/316, 147, 346, 260
See application file for complete search history.

(56) References Cited

U.S. PATENT DOCUMENTS

| | | | | |
|---|---|---|---|---|
| 5,185,764 | A * | 2/1993 | Baier | 375/231 |
| 6,850,481 | B2 * | 2/2005 | Wu et al. | 370/208 |
| 7,269,127 | B2 * | 9/2007 | Mody et al. | 370/210 |
| 7,272,108 | B2 * | 9/2007 | Li et al. | 370/203 |
| 2003/0076777 | A1 * | 4/2003 | Stuber et al. | 370/206 |
| 2005/0002461 | A1 * | 1/2005 | Giannakis et al. | 375/259 |
| 2005/0152482 | A1 * | 7/2005 | Tubbax et al. | 375/346 |
| 2005/0163236 | A1 * | 7/2005 | Hammerschmidt et al. | 375/260 |
| 2005/0164655 | A1 * | 7/2005 | Nakao et al. | 455/101 |
| 2005/0180386 | A1 * | 8/2005 | Hansen et al. | 370/350 |
| 2005/0281241 | A1 * | 12/2005 | Webster et al. | 370/343 |
| 2006/0002361 | A1 * | 1/2006 | Webster et al. | 370/343 |
| 2006/0002487 | A1 * | 1/2006 | Kriedte et al. | 375/267 |
| 2006/0072524 | A1 * | 4/2006 | Perahia et al. | 370/338 |
| 2006/0227891 | A1 * | 10/2006 | Niu et al. | 375/267 |
| 2006/0251193 | A1 * | 11/2006 | Kopmeiners et al. | 375/345 |
| 2006/0252386 | A1 * | 11/2006 | Boer et al. | 455/101 |
| 2006/0253765 | A1 * | 11/2006 | Boer et al. | 714/749 |
| 2007/0060073 | A1 * | 3/2007 | Boer et al. | 455/101 |
| 2007/0147527 | A1 * | 6/2007 | Egashira et al. | 375/260 |
| 2007/0206519 | A1 * | 9/2007 | Hansen et al. | 370/310 |
| 2007/0230431 | A1 * | 10/2007 | Driesen et al. | 370/345 |
| 2008/0002780 | A1 * | 1/2008 | Yu et al. | 375/267 |

OTHER PUBLICATIONS

Kose, Cenk, et al., "Wireless LANs, WWiSE Proposal; High throughput extension to the 802.11 Standard", IEEE P802.11 (05/0149r1), (Jan. 6, 2005), 1-91.

* cited by examiner

*Primary Examiner*—Chieh M Fan
*Assistant Examiner*—Jason M. Perilla
(74) *Attorney, Agent, or Firm*—Schwegman, Lundberg & Woessner, P.A.; Gregory J. Gorrie

(57) ABSTRACT

Embodiments of system and method for determining channel coefficients in a wireless network are generally described herein. Other embodiments may be described and claimed. In some embodiments, channel coefficients of a multiple-input multiple-output (MIMO) channel may be determined without interpolation.

18 Claims, 5 Drawing Sheets

MIMO SYSTEM

PREAMBLES

PREAMBLES

METHOD FOR DETERMINING MULTIPLE-INPUT MULTIPLE-OUTPUT (MIMO) CHANNEL COEFFICIENT USING POLARITY-INVERTED TRAINING SIGNALS IN AN ORTHOGONAL FREQUENCY DIVISION MULTIPLEXED (OFDM) MULTICARRIER SYSTEM

TECHNICAL FIELD

Some embodiments of the present invention pertain to multicarrier communication systems that use two or more antennas and two or more receivers to communicate. Some embodiments of the present invention relate to multiple-input multiple-output (MIMO) communication systems. Some embodiments of the present invention relate to systems that communicate orthogonal frequency division multiplexed (OFDM) signals. Some embodiments of the present invention relate to wireless local area networks (WLANs).

BACKGROUND

Many wireless communication systems transmit special signals, sometimes referred to as training signals, to allow a receiver to acquire the signal, to perform automating gain control (AGC), to perform carrier frequency and timing corrections, and to estimate the characteristics of the radio-frequency (RF) channel. A multiple-input multiple-output (MIMO) communication system may use two or more antennas to transmit data and two or more antennas to receive data. Channel estimates in these MIMO systems may be used for channel equalization and to separate different spatial streams transmitted together. In some cases, channel estimates may also be used for beamforming. In some MIMO systems, such as MIMO systems in accordance with the World Wide Spectrum Efficiency (WWiSE) proposal for a high-throughput extension to the Institute of Electrical and Electronics Engineers standards for wireless local area networks discussed in more detail below, interpolation may be required to determine the channel characteristics for all subcarrier frequencies in the frequency bandwidth because of the configuration of the training signals. This interpolation generally assumes that the channel characteristics are smooth, at least with respect to adjacent or nearby subcarriers. In many cases, the channel is not smooth resulting in less accurate channel estimates. This makes channel equalization and the separation of spatial streams in MIMO systems difficult. It may also result in the generation of less-accurate beamforming coefficients.

Thus there are general needs for methods for generating channel estimates for a MIMO channel that do not require interpolation.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

Figure 1A:
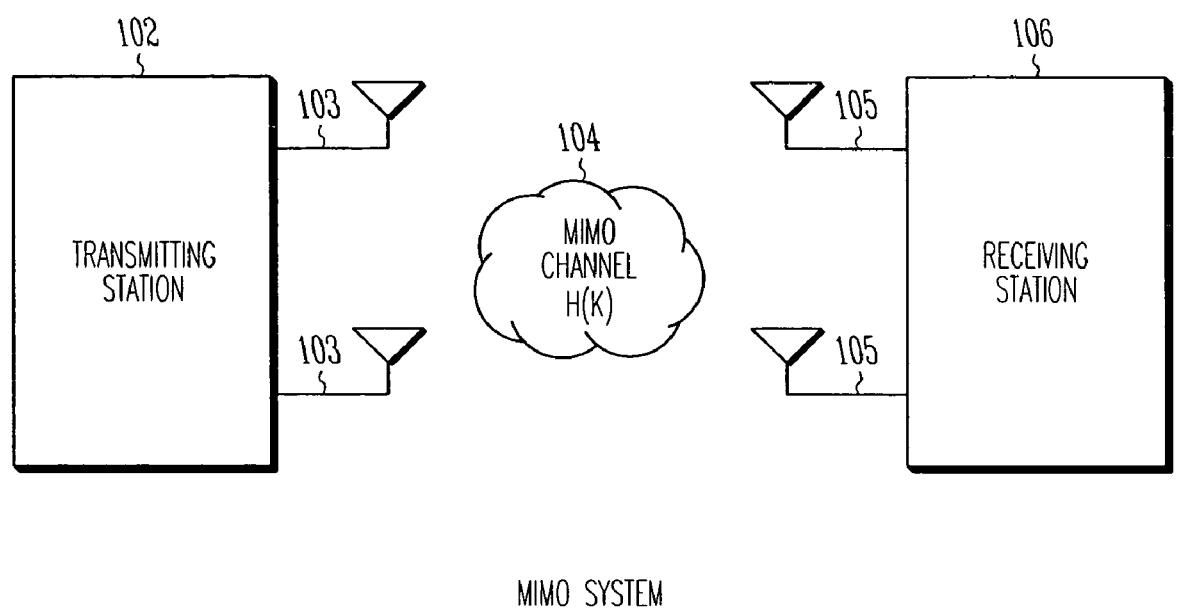
FIG. 1A illustrates a multiple-input multiple-output (MIMO) communication system in accordance with some embodiments of the present invention.

FIG. 1A illustrates a multiple-input multiple-output (MIMO) communication system in accordance with some embodiments of the present invention. MIMO system 100 comprises transmitting station 102 and receiving station 106 which may communicate with each other through channel 104. Transmitting station 102 may use two or more transmit antennas 103 to transmit signals to receiving station 106 and receiving station 106 may use two or more receive antennas 105 to receive the signals transmitted by transmitting station 102.

Channel 104 may be viewed as a MIMO channel because transmitting station 102 uses two or more antennas 103 to transmit signals and receiving station 106 uses two or more receive antennas 105 to receive signals. Signal paths through the channel may be associated with the different transmit-receive antenna combinations and may have distinct and time-varying channel characteristics.

In accordance with some embodiments of the present invention, transmitting station 102 may transmit preambles that include known training signals, which may precede each packet or frame, to receiving station 106 to allow receiving station 106 to acquire the signal, to perform automating gain control (AGC), to perform carrier frequency and timing corrections, and to estimate the characteristics of channel 104. Channel characteristics may be represented by channel coefficients and may be used for channel equalization, separation of spatial data streams and/or generation of beamforming coefficients.

In accordance with these embodiments, the preambles may be selected so that receiving station 106 may generate the channel coefficients of channel 104 without interpolation. This may provide more accurate channel coefficients. These embodiments are discussed in more detail below.

In some embodiments, transmitting station 102 may transmit separate spatial data streams using one or more of antennas 103. In these embodiments, each transmit antenna 103 may transmit using the same frequency subcarriers. In these embodiments, receiving station 106 may generate channel coefficients from channel estimates for use in separating the spatial streams, which are mixed up in the channel. In some embodiments, the channel coefficients may be used to generate beamforming coefficients for use by transmitting station in transmitting subsequent flames or packets, although the scope of the invention is not limited in this respect.

In some embodiments, system 100 may take advantage of antenna diversity and the characteristics of channel 104 to communicate more than one spatial data stream simultaneously transmitted on the same frequency subcarriers. The terms receiving and transmitting are used for convenience to describe stations 102 and 106 and are not meant to be limiting. In some embodiments, either station may have both receiving and transmitting capabilities, although the scope of the invention is not limited in this respect.

Figure 1B:
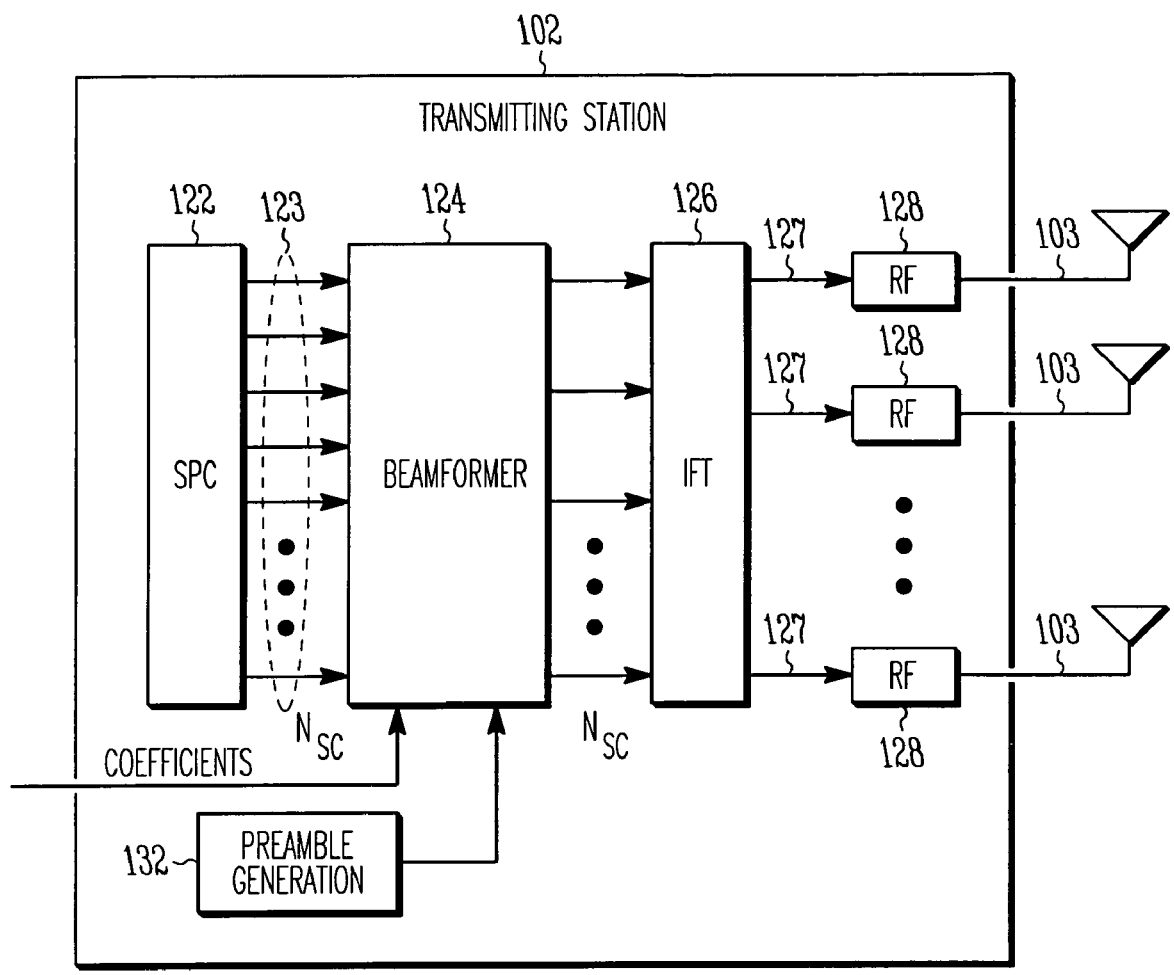
FIG. 1B illustrates a transmitting station in accordance with some embodiments of the present invention.

FIG. 1B illustrates a transmitting station in accordance with some embodiments of the present invention. Transmitting station 102 may correspond to transmitting station 102 (FIG. 1A). Transmitting station 102 may generate one or more spatial data streams from an input bit stream. The one or more spatial data streams may be transmitted by at least that number of transmit antennas 103. Transmitting station 102 may include signal processing circuitry (SPC) 122 to generate frequency-domain symbols 123 for each of a plurality of subcarriers. The number of subcarriers may be represented by Nsc. Transmitting station 102 may also include inverse Fourier-transform (IFT) circuitry 126 to perform an IFT on the frequency-domain input signals and to generating time-domain signals 127. Transmitting station 102 may also include radio-frequency (RF) circuitry 128 for generating RF signals for transmission by one of transmit antennas 103. In some embodiments without beamforming, each antenna 103 may transmit a separate spatial data stream, although the scope of the invention is not limited in this respect.

In accordance with some embodiments of the present invention, transmitting station 102 may include preamble generation circuitry 132 to generate preambles for transmission. This is described in more detail below. In some embodiments, transmitting station 102 may also include beamformer 124 to apply beamforming coefficients to frequency-domain symbols 123 for each subcarrier prior to the operations of IFT circuitry 126, although the scope of the invention is not limited in this respect. Beamformer 124 may generate Nsc frequency-domain symbols as its output.

Figure 1C:
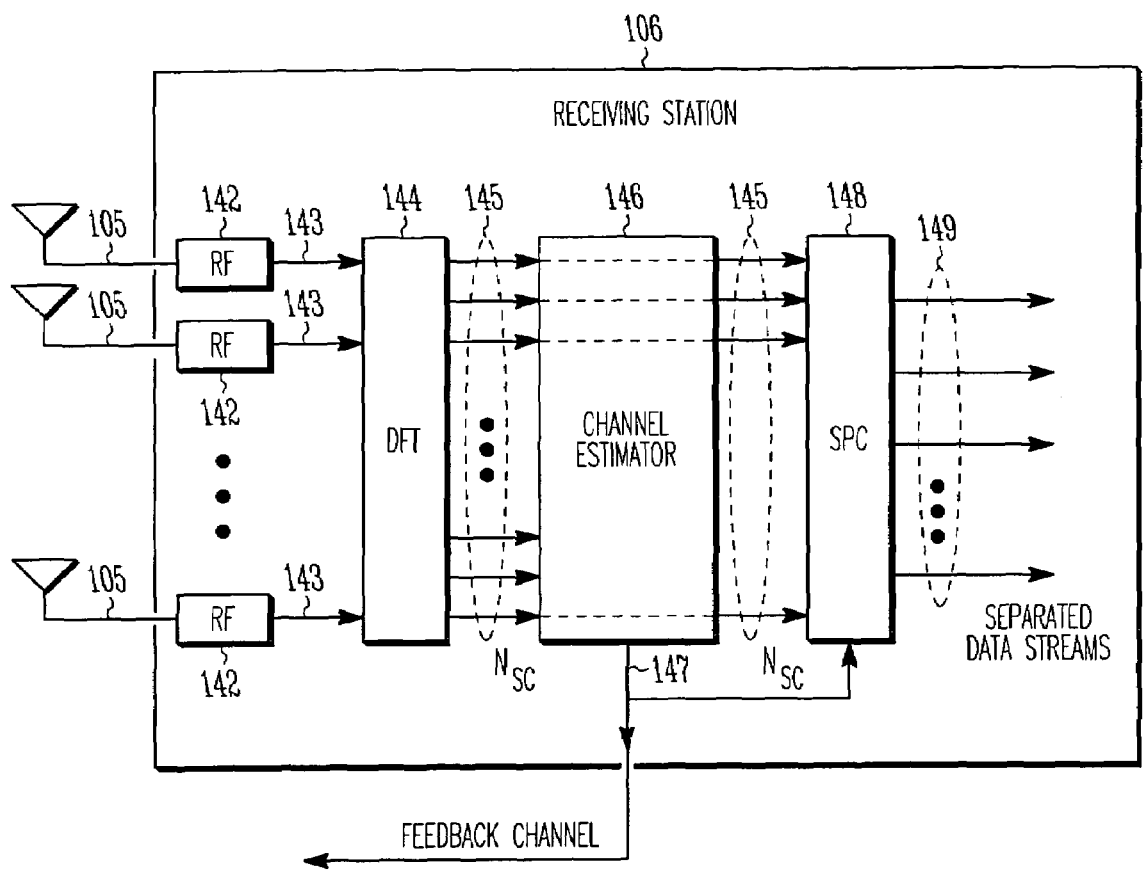
FIG. 1C illustrates a receiving station in accordance with some embodiments of the present invention.

FIG. 1C illustrates a receiving station in accordance with some embodiments of the present invention. Receiving station 106 may correspond to receiving station 106 (FIG. 1A). Receiving station 106 comprises two or more receiving antennas 105 to receive multicarrier signals, and RF circuitry 142 to convert the received signals from an associated receive antenna to digital baseband signals 143. Receiving station 106 may also comprise discrete Fourier transform (DFT) circuitry 144 to perform a DFT on the time-domain signals from each receive antenna 105 to generate frequency-domain signals 145 associated with each subcarrier of the received multicarrier signal. DFT circuitry 144 may generate a frequency-domain signal for each of a total of Nsc subcarrier signals.

Receiving station 106 may also include channel estimator 146 to generate channel coefficients 147 from the preambles transmitted by transmitting station 102. Channel coefficients 147 may be used, among other things, for processing frequency-domain signals 145 by signal-processing circuitry (SPC) 148 and generating one or more output data streams 149. In some embodiments without beamforming, signal processing circuitry 148 may generate one output data stream for each spatial data stream transmitted by transmitting station 102. In some embodiments, the individual transmit antennas 103 of transmitting station 102 may each transmit one spatial data stream, although the scope of the invention is not limited in this respect. In some other embodiments, when beamforming coefficients are applied, the number of spatial data streams transmitted by transmitting station 102 may not correspond to the number of transmit antennas 103 used and each transmit antenna 103 may transmit a different mix of spatial data streams, although the scope of the invention is not limited in this respect.

In some embodiments, channel coefficients 147 may be transmitted to transmitting station 102 through a feedback channel as part of a closed loop process. In these embodiments, transmitting station 102 may generate beamforming coefficients for use in subsequent transmissions to receiving station 106. In some other embodiments, receiving station 106 may generate the beamforming coefficients and transmit the beamforming coefficients to transmitting station 102 for use by beamformer 124, although the scope of the invention is not limited in this respect.

In yet some other embodiments, receiving station 106 may assume reciprocity of the channel (i.e., that the channel conditions are the same in both directions). In these embodiments, receiving station 106 may use the channel coefficients it generates for transmissions to transmitting station 102. For example, receiving station 106 may generate beamforming coefficients and may use these beamforming coefficients for it's transmissions to transmitting station 102, although the scope of the invention is not limited in this respect. In these embodiments, a calibration procedure may be performed from time-to-time to help ensure that the assumption of channel reciprocity is reasonable.

Figure 2:
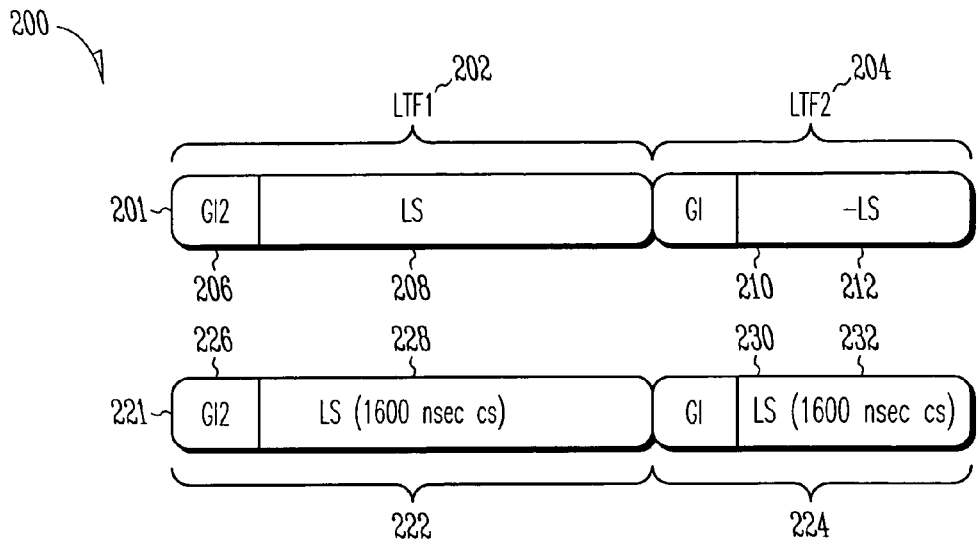
FIG. 2 illustrates preambles in accordance with some embodiments of the present invention.

FIG. 2 illustrates preambles in accordance with some embodiments of the present invention. Preambles 200 may be transmitting by transmitting station 102 to receiving station 106 for use in generating channel coefficients. In some 2×2 MIMO embodiments in which transmitting station 102 and receiving station 106 each use two antennas, preamble 201 may be mapped to a first spatial stream and preamble 221 may be mapped to a second spatial stream. In some embodiments, the first spatial stream may be transmitted by one transmit antenna 103 and the other spatial stream may be transmitted by the other transmit antenna 103. In some other embodiments, beamforming coefficients may be applied to the first and second spatial streams and both the first and second spatial streams may be transmitted by both transmit antennas 103, although the scope of the invention is not limited in this respect. Both transmit antennas may transmit concurrently on the same frequency subcarriers.

As illustrated, preamble 201 comprises first long-training field (LTF1) 202 and second long-training field (LTF2) 204. LTF1 202 includes guard interval (GI2) 206 and training signals (LS) 208. LTF2 204 includes guard interval 210 and training signals (−LS) 212. In some embodiments, training signals 212 comprise a polarity-inverted version of training signals 208.

As illustrated, preamble 221 comprises first long-training field (LTF1) 222 and second long-training field (LTF2 ) 224. LTF1 222 includes guard-interval 226 and training signals 228. LTF2 224 includes guard interval 230 and training signals 232. In some embodiments, training signals 228 and 232 are cyclically shifted versions of training signals 208. In the example of FIG. 2, training signals 228 and 232 are illustrated with a cyclic-shift (cs) of 1600 nanosecond (nsec), although the scope of the invention is not limited in this respect. The duration of the cyclic-shift may be selected so that half the symbol duration will provide a $(-1)^k$ in the frequency domain in which 'k' represents the subcarrier number. This is discussed in more detail below. Other durations for the cyclic shifts may also be suitable in which half the symbol duration provides a $(-1)^k$ in the frequency domain.

Without the second training fields, LTF2 204 and LTF2 224, the received signal may be described by the following equation:

$$r_{L-LTF}^{(i_{TX})}(t) = \sum_{k=-N_{SR}}^{N_{SR}} LS_k \exp(j2\pi k \Delta_F(t - T_{GI2} + i_{TX}T_{\square DD}))$$

In this equation, $i_{TX}$ is the spatial stream index (0,1), $T_{CDD}$=600 ns, $T_{GI2}$=1600 ns, $\Delta_F$=312.5 kHz, $LS_K$ is the training signal at the $k^{th}$ frequency, and $N_{SR}$ is the half the number of subcarrier frequencies. At receiving station 106 in the $k^{th}$ frequency and in the $i_{RX}$ channel, the received signal may be represented by $$LS_k(H_{1i_{RX}}{}^k + (-1)^k H_{2i_{RX}})$$

From this equation, for the even numbered subcarrier frequencies, the sum of the two channels may be obtained. For the odd numbered subcarrier frequencies (k odd) the difference of the two channels may be obtained. By interpolating across subcarrier frequencies, an estimate of the sum and difference for all subcarrier frequencies may be obtained and the channel estimate can be readily generated.

In accordance with embodiments of the present invention, by the addition of second training fields, such as LTF2 204 and LTF2 224, the sum and difference of the channels may be directly obtained for all subcarrier frequencies without interpolation. This may allow more accurate channel estimates to be determined especially for channels that are not smooth. In some embodiments, the first training field (LTF1) may be an 8 microsecond (μsec) long signal and the second training field (LTF2) may be 4 μsec long signal, although the scope of the invention is not limited in this respect. In some embodiments, both the LTF1 and the LTF2 may be have the same duration.

In these embodiments, after the transmission of LTF1 202, LTF2 204 is transmitted. LTF2 204 may includes a polarity-inverted version of the training signals (illustrated as –LS). In these embodiments, the received signal may be described by the following equation:

$$r_{L-LTF2}^{(i_{TX})}(t) = (-1)^{1-i_{TX}} \sum_{k=-N_{SR}}^{N_{SR}} LS_k \exp(j2\pi k \Delta_F(t - T_{GI2} + i_{TX}T_{\square DD}))$$

In the receiver for the $k^{th}$ subcarrier frequency and in the $i_{RX}$ channel, the received signal may be represented as:

$$LS_k(-H_{1i_{RX}}{}^k + (-1)^k H_{2i_{RX}})$$

By combining the two measurements, the $k^{th}$ subcarrier frequency provides a set of equations which may be represented by the following invertible matrix:

$$\begin{pmatrix} R_k^{(i_{RX})LTF1} \\ R_k^{(i_{RX})LTF2} \end{pmatrix} = \begin{pmatrix} 1 & (-1)^k \\ -1 & (-1)^k \end{pmatrix} \begin{pmatrix} H_{1i_{RX}}^k \\ H_{2i_{RX}}^k \end{pmatrix}$$

Since for every subcarrier k, the matrix is invertible, the channel estimate $H_{mn}{}^k$ may be recovered for every m, n, k without using frequency interpolation. The subscripts m and n refer, respectively, to the number of transmit and receive antennas which may range from as few as two to up to four or more, and in some cases, up to ten or more. In some embodiments, a longer preamble (e.g., around 8 usec duration) may be used to provide a periodic signal for frequency estimation, although the scope of the invention is not limited in this respect. In some embodiments, described in more detail below, additional sets of preambles may be used.

Although transmitting station 102 and receiving station 106 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of transmitting station 102 and receiving station 106 may refer to one or more processes operating on one or more processing elements. In some embodiments, signal processing circuitry 122 may perform the functions of one or more of beamformer 124, IFT 126 and preamble generation circuitry 132, although the scope of the invention is not limited in this respect. In some embodiments, signal processing circuitry 148 may perform the functions of one of more of DFT 144 and channel estimator 146, although the scope of the invention is not limited in this respect.

Figure 3:
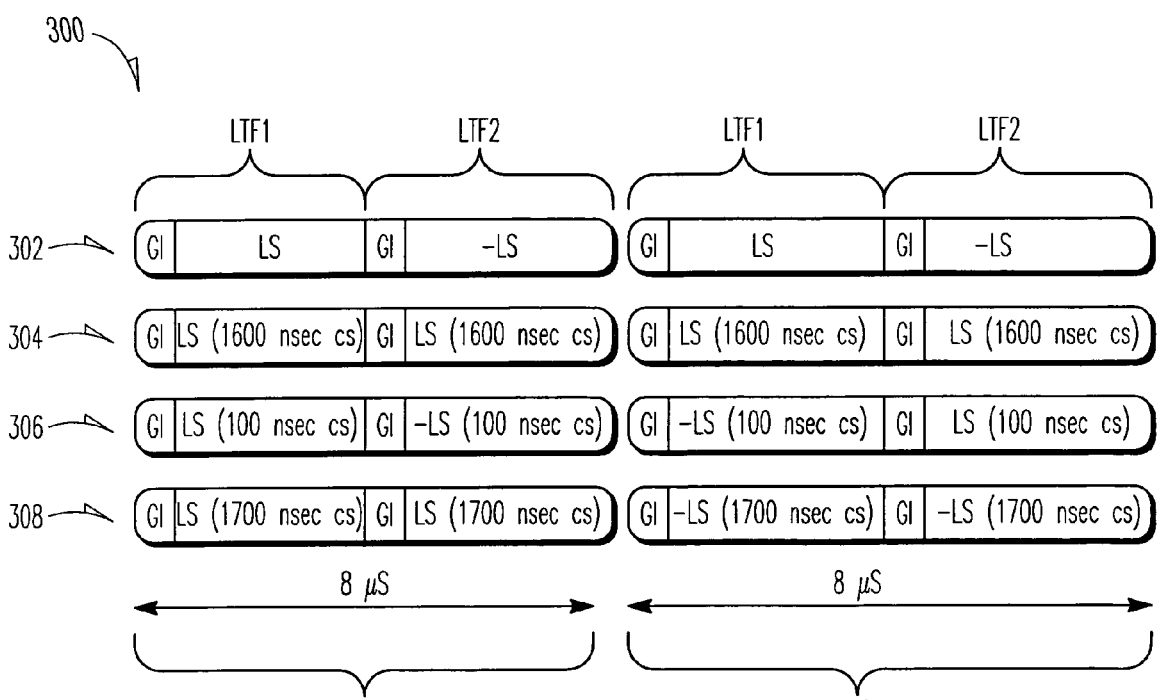
FIG. 3 illustrates preambles in accordance with some other embodiments of the present invention.

FIG. 3 illustrates preambles in accordance with some other embodiments of the present invention. Preambles 300 include first sets of preambles 310 and second sets of preambles 312. In these embodiments, a 4×4 MIMO system may use four transmit antennas 103 and four receive antennas 105. In these embodiments, prior to the generation and use of beamforming coefficients, preambles 302 may be transmitted by a first of transmit antennas 103, preambles 304 may be transmitted by a second of transmit antennas 103, preambles 306 may be transmitted by a third of transmit antennas 103, and preambles 308 may be transmitted by a fourth of transmit antennas 103. In some other embodiments, when beamforming coefficients are used, the different preambles may be mapped to different spatial streams instead of different transmit antennas, although the scope of the invention is not limited in this respect. As illustrated, the training signals of each preamble may have different cyclic shifts to allow for their separation at the receiver. The duration of the cyclic-shift for each preamble may be selected so that half the symbol duration will provide a $(-1)^k$ in the frequency domain. In the example illustrated in FIG. 3, cyclic shifts of 100 nsec and 1700 nsec are chosen for the third and fourth preambles, respectively, because they are close to the cyclic shifts of zero and 1600 nsec selected for the first and second preambles, respectively. In this way, these half the symbol duration may provide about a $(-1)^k$ in the frequency domain while avoiding possible undesirable effects of using the same cyclic-shift durations as the first and second preambles. In some embodiments, the LTF1 may be lengthened for improved frequency estimation, although the scope of the invention is not limited in this respect.

In accordance with some embodiments, as illustrated in FIG. 3, some preambles include a polarity-inverted version of the training signals (illustrated as –LS) in either the LTF1 or the LTF2. The selection of where to include the polarity-inverted version of the training signals may be determined by the following set of linear equations which may be used to recover the channel coefficients. The set of linear equations may be represented by the following invertible matrix:

$$\begin{pmatrix} R_k^{(i_{RX})LTF1} \\ R_k^{(i_{RX})LTF2} \\ R_k^{(i_{RX})LTF3} \\ R_k^{(i_{RX})LTF4} \end{pmatrix} = \begin{pmatrix} 1 & (-1)^k & 1 & (-1)^k \\ -1 & (-1)^k & -1 & (-1)^k \\ 1 & (-1)^k & -1 & -(-1)^k \\ -1 & (-1)^k & 1 & -(-1)^k \end{pmatrix} \begin{pmatrix} H_{1i_{RX}}^k \\ H_{2i_{RX}}^k \\ H_{3i_{RX}}^k \\ H_{4i_{RX}}^k \end{pmatrix}$$

In this matrix, the R's represent the received signal on each receive antenna, the H's represent the channel estimates for each signal path through the channel, and k represents the subcarrier frequency number. One purpose of transmitting polarity-inverted versions of the training signals is to make the combinations invertible. For example, the matrix above may provide a frequency-domain representation for each subcarrier and may be viewed as a set of four equations in which each equation describes one of the four parts of the training signals. For example, the first line of the matrix states that for LTF1 in the first set, an estimation for $H_1(k)+(-1)^k H_2(k)+H_3(k)+(-1)^k H_4(k)$ is provided. Other combinations for the other three parts are described in the subsequent lines of this matrix.

For preambles 300, both for odd k (in which $(-1)^k=-1$) and for even k (for which $(-1)^k=1$), a set of 4 equations are four unknowns result. This set of linear equations is solvable and all channel estimates of the 4×4 MIMO channel (i.e., $H_1$, $H_2$, $H_3$, $H_4$) may be readily determined from the signals received at each receive antenna 105 without frequency interpolation. Mathematically, this may be stated by saying that the matrix is invertible.

In some embodiments, locations other than those illustrated in preambles 300 (FIG. 3) of where to include polarity-inverted training signals may be used provided that the choice results in an invertible matrix or set of equations solvable for both odd and even subcarrier numbers k.

In accordance with some embodiments of the present invention, channel coefficients of MIMO channel 104 may be determined without interpolation. In these embodiments, receiving station 106 may receive preambles 200 or 300 through channel 104 after being transmitted by two or more transmit antennas 103. For a 2×2 MIMO channel, at least one of preambles 200 may comprise training signals 208 and a polarity-inverted version of training signals 212. In these embodiments, channel estimator 146 may calculate sum and difference channel signals (i.e., $H_1(k)+H_2(k)$, $H_1(k)-H_2(k)$) for each subcarrier (k) of a plurality of subcarriers based on the received preambles 200. Channel estimator 146 may also determine channel coefficients (i.e., $H_1(k)$, $H_2(k)$) of the channel from the sum and difference channel signals by solving a set of linear equations discussed above. In a 2×2 MIMO channel, the sum channel signal may be represented by $H_1(k)+H_2(k)$ and the difference channel signal may be represented by $H_1(k)-H_2(k)$, where $H_1(k)$ represents the channel estimate for the first transmit antenna for the $k^{th}$ subcarrier, and where $H_2(k)$ represents the channel estimate for the second transmit antenna for the $k^{th}$ subcarrier.

In some embodiments, the polarity-inverted version of the training signals 212 may be generated at transmitting station 102 by negating all samples of the training signals in the time-domain after performance of an inverse Fourier transform (IFT). In some other embodiments, the polarity-inverted version of the training signals 212 is generated at transmitting station 102 by negating the samples of the training signals 208 in the frequency-domain before performance of the inverse Fourier transform (IFT).

In some embodiments, the training signals comprise a sequence of 1's and −1's representing values assigned to each subcarrier of a plurality of subcarriers of an orthogonal-frequency division multiplexed (OFDM) signal. An example of a training sequence is illustrated below. An IFT may be performed on the training sequence to generate a time-domain waveform for transmission by transmit antennas 103. In some embodiments, the polarity-inverted version of the training signals 212 may be generated by preamble generation circuitry 132 by negating all samples of the training signals prior to transmission. For example, the equation below may represent the values of the training signals transmitted by each subcarrier. In this example, there are 56 subcarriers.

$LS_{20}$ (−28 . . . 28)={1, 1, 1, 1, −1, −1, 1, 1, −1, 1, −1, 1, 1, 1, 1, 1, 1, −1, −1, 1, 1, −1, 1, −1, 1, 1, 1, 1, 0, 1, −1, −1, 1, 1, −1, 1, −1, 1, −1, −1, −1, −1, −1, 1, 1, −1, −1, 1, −1, 1, −1, 1, 1, 1, 1, −1, −1}

In the above equation, there are non-zero values for each subcarrier (k=−28 . . . −1 and 1 . . . 28). The zero represents DC and is not used. An IFT may be performed by IFT circuitry 126 on the training signals by modulating the values of the above sequence on each subcarrier. In some embodiments, two periods of a long symbol may be transmitted for improved channel estimation accuracy. This example of a training sequence may be transmitted simultaneously from two or more of antennas 103. In a two-antenna embodiment, the second antenna may transmit a 1600 nsec cyclically shifted version of the long training symbols transmitted from the first antenna, although the scope of the invention is not limited in this respect. In three and four antenna embodiments, different cyclic shifts may be used provided that half the symbol duration provides about a $(-1)^k$ in the frequency domain. Other portions of the preambles may include polarity-inverted versions of the training signals.

In some embodiments, calculating sum and difference channel signals may include determining the sum channel signals for a first set (e.g., even numbered) of the subcarriers from the (non-polarity-inverted) training signals, and determining the difference channel signals for a second set (e.g., odd numbered) of the subcarriers from the (non-polarity-inverted) training signals. In these embodiments, calculating sum and difference channel signals may also include determining the sum channel signals for the second set (e.g., odd numbered) of the subcarriers from the polarity-inverted training signals, and determining the difference channel signals for the first set (e.g., even numbered) of the subcarriers from the polarity-inverted training signals. In these embodiments, the first set of subcarriers may refer to the even numbered subcarriers and the second set of subcarriers may refer to odd numbered subcarriers, although the scope of the invention is not limited in this respect. The terms 'even' and 'odd' as used herein are not meant to be limiting and in some embodiments, may be interchanged. Accordingly, the sum and difference channel signals may be able to be determined for all subcarriers directly (i.e., without interpolation). This is unlike other channel estimation techniques which may require the use of interpolation to determine the sum channel signals for the second set (e.g., odd numbered) of the subcarriers and the difference channel signals for the first set (e.g., even numbered) of the subcarriers.

In some embodiments, the set of linear equations comprises an invertible matrix. The invertible matrix may allow the set of channel coefficients to be solved when the sum and difference channel signals for all subcarriers are known. Whether to transmit the training signals or the polarity-inverted version of the training signals in either a first portion of a second portion of each preamble may be pre-determined so that the set of linear equations is solvable.

Referring to FIGS. 1B, 1C, 2 and 3, in some embodiments, preamble generation circuitry 132 (FIG. 1B) may generate preambles 200 (FIG. 2) or preambles 300 (FIG. 3) for transmission to receiving station 106 (FIG. 1C). In some embodiments, preamble generation circuitry 132 (FIG. 1B) may provide the preambles to IFT circuitry 126 (FIG. 1B) without beamforming. In some embodiments, particularly after the beamforming coefficients are determined, preamble generation circuitry 132 (FIG. 1B) may provide the preambles to beamformer 124 (FIG. 1B), and the beamforming coefficients may be applied to the preambles prior to transmission as part of sequence of packets. The use of beamforming coefficients may allow receiving station 106 (FIG. 1C) to estimate the updated channel with each packet, as the channel may be varying with time. Signal processing circuitry 148 (FIG. 1C) of receiving station 106 (FIG. 1C) may use updated channel estimates generated from the transmitted preambles for equalization of the received signal. In some embodiments, the beamforming coefficients do not need to be updated every packet. In some embodiments, beamforming may help improve the channel's signal-to-noise ratio at the expense of smoothness, although the scope of the invention is not limited in this respect.

In some embodiments, transmitting station 102 (FIG. 1A) and receiving station 106 (FIG. 1A) may be part of wireless communication devices that may communicate OFDM communication signals. In some embodiments, transmitting station 102 (FIG. 1A) and receiving station 106 (FIG. 1A) may communicate orthogonal frequency division multiple access (OFDMA) communication signals, although the scope of the invention is not limited in this respect. In some embodiments, transmitting station 102 (FIG. 1A) and receiving station 106 (FIG. 1A) may communicate over a multicarrier communication channel. The multicarrier communication channel may be within a predetermined frequency spectrum and may comprise a plurality of orthogonal subcarriers. In some embodiments, the orthogonal subcarriers may be closely spaced OFDM subcarriers. To help achieve orthogonality between the closely spaced subcarriers, each subcarrier may have a null at substantially a center frequency of the other subcarriers. In some embodiments, to help achieve orthogonality between the closely spaced subcarriers, each subcarrier may have an integer number of cycles within a symbol period, although the scope of the invention is not limited in this respect.

In some embodiments, the frequency spectrums for a multicarrier communication channel may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some broadband and Worldwide Inoperability for Microwave Access (WiMax) embodiments, the frequency spectrum for communications may comprise frequencies between 2 and 11 GHz, although the scope of the invention is not limited in this respect.

In some embodiments, transmitting station 102 and receiving station 106 may communicate in accordance with specific communication standards, such as the Institute of Electrical and Electronics Engineers (IEEE) standards including IEEE 802.11(n) standard for wireless local area networks (WLANs), although transmitting station 102 and receiving station 106 may also be suitable to transmit and/or receive communications in accordance with other techniques. In some embodiments, transmitting station 102 and receiving station 106 may operate in accordance with the World Wide Spectrum Efficiency (WWiSE) proposal for high-throughput extension to the IEEE 802.11(n) WLAN standard, although the scope of the invention is not limited in this respect. In some broadband and WiMax embodiments, transmitting station 102 and receiving station 106 may communicate broadband wireless communications in accordance with the IEEE 802.16(e) standards for wireless metropolitan area networks (WMANs). For more information with respect to IEEE 802.11 standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related amendments/versions.

In some embodiments, transmitting station 102 and receiving station 106 may each be part of portable wireless communication devices, such as personal digital assistants (PDAs), a laptop or portable computers with wireless communication capability, web tablets, wireless telephones, wireless headsets, pagers, instant messaging devices, digital cameras, access points, televisions or other devices that may receive and/or transmit information wirelessly. In some WLAN and Wireless Fidelity (WiFi) embodiments, transmitting station 102 may be part of an access point (AP) and receiving station 106 may be part of a communication station (STA), although the scope of the invention is not limited in this respect. In some broadband and WiMax embodiments, transmitting station 102 may be part of a broadband transmitting station and receiving station 106 may be part of a broadband receiving station, although the scope of the invention is not limited in this respect.

Antennas 103 and 105 may comprise directional or omnidirectional antennas, including, for example, dipole antennas, monopole antennas, patch antennas, loop antennas, microstrip antennas or other types of antennas suitable for transmission of RF signals. In some embodiments, instead of two or more antennas, either transmitting station 102 or receiving station 105 may use a signal antenna with multiple apertures.

Figure 4:
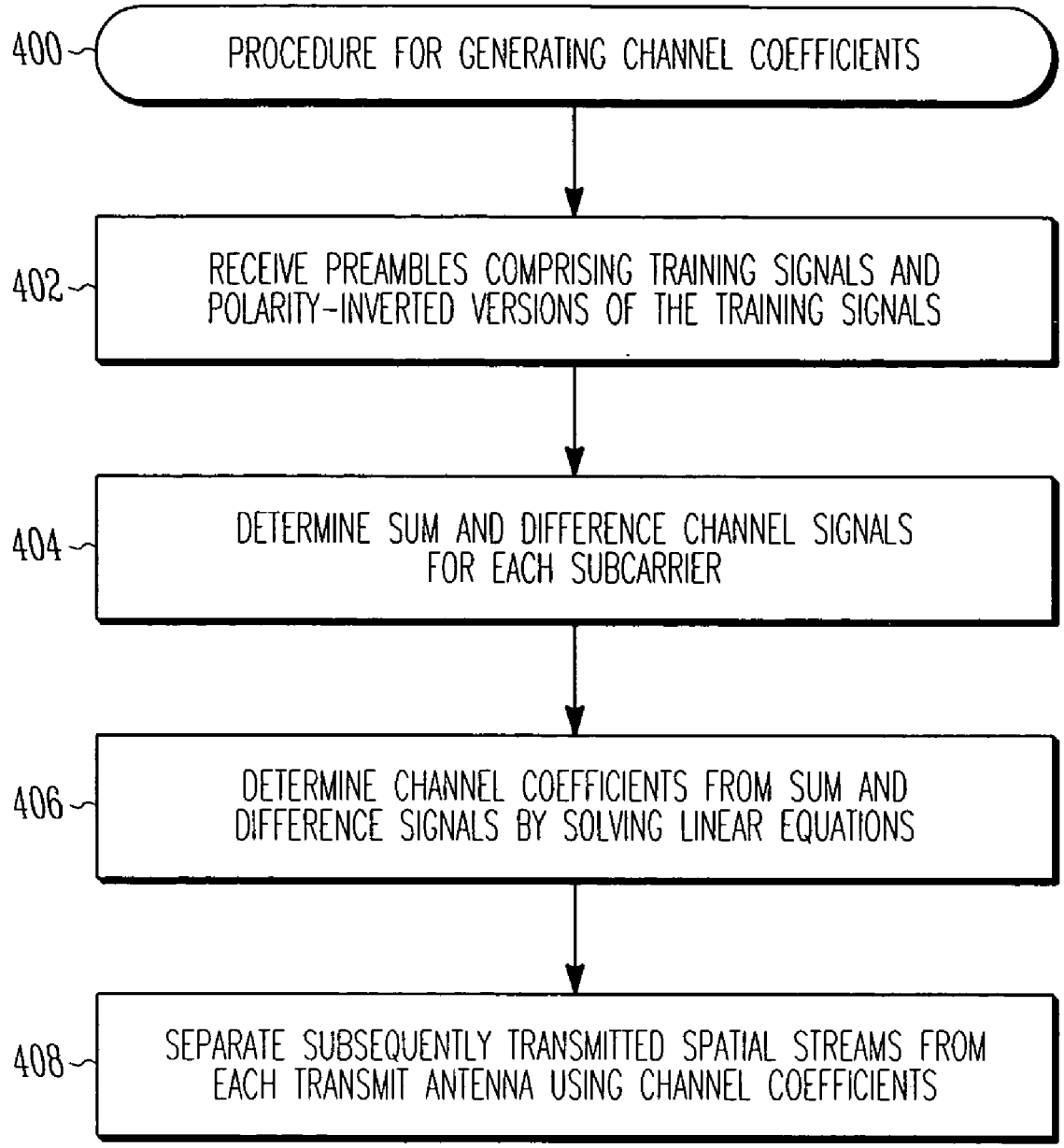
FIG. 4 is a flow chart of procedure for generating channel coefficients in accordance with some embodiments of the present invention.

FIG. 4 is a flow chart of procedure for generating channel coefficients in accordance with some embodiments of the present invention. Procedure 400 may be performed by receiving station 106 (FIG. 1A) to generate channel coefficients and separate separately transmitted spatial data streams transmitted by a transmitting station, such as transmitting station 102 (FIG. 1A). Although the individual operations of procedure 400 are illustrated and described as separate operations, one or more of the individual operations may be performed concurrently, and nothing requires that the operations be performed in the order illustrated.

Operation 402 comprises receiving preambles through a MIMO channel. The preambles may include first and second training fields (e.g., LTF1 and LTF2). The training fields may include training signals and some of the training fields may include polarity-inverted versions of the training signals.

Operation 404 comprises calculating the sum and difference channel signals (e.g., $H_1(k)+H_2(k)$, $H_1(k)-H_2(k)$) for each subcarrier (k) based on the received preambles, such as preambles 200 (FIG. 2) or preambles 300 (FIG. 3).

Operation 406 comprises determining the channel coefficients from the sum and difference channel signals by solving a set of linear equations.

Operation 408 comprises applying the channel coefficients to equalize the channel and/or to separate spatial streams. The spatial streams may have been transmitted by different transmit antennas when beamforming is not applied or may have been transmitted by all the transmit antennas by the application of beamforming coefficients. Some embodiments of the present invention are equally suitable when one spatial stream is transmitted by more than one transmit antenna.

In some embodiments, procedure 400 may also comprise generating beamforming coefficients from the channel coefficients. The beamforming coefficients may either be generated by the receiving station or the transmitting station and in some cases may be used for the reverse channel (i.e., assuming channel reciprocity). In some embodiments, the beamforming coefficients may be applied to frames subsequently transmitted by the transmitting station. These subsequently transmitted frames may include preambles, such as preambles 200 (FIG. 2) and/or 300 (FIG. 3), although the scope of the invention is not limited in this respect.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Some embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features may be occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A method of communications in a multi-carrier communication station comprising:

receiving preambles through a multiple-input multiple-output channel transmitted by two or more transmit antennas, each preamble comprising training signals, one of the preambles comprising the training signals and a polarity-inverted version of the training signals;

calculating sum and difference channel signals for each subcarrier of a plurality of subcarriers based on the received preambles; and determining channel coefficients of the multiple-input multiple-output channel from the sum and difference channel signals using a set of linear equations, wherein calculating sum and difference channel signals comprises:

determining the sum channel signals for a first set of the subcarriers from the training signals;

determining the difference channel signals for a second set of the subcarriers from the training signals;

determining the sum channel signals for the second set of the subcarriers from the polarity-inverted version of training signals; and determining the difference channel signals for the first set of the subcarriers from the polarity-inverted version of training signals.

2. The method of claim 1 wherein the preambles are received through the multiple-input multiple-output channel through two or more receive antennas, and wherein the polarity-inverted version of the training signals is generated at a transmitting station by negating samples of the training signals prior to transmission.

3. The method of claim 2 wherein the polarity-inverted version of the training signals is generated at the transmitting station by negating the samples of the training signals in the time-domain after performance of an inverse Fourier transform.

4. The method of claim 2 wherein the polarity-inverted version of the training signals is generated at the transmitting station by negating the samples of the training signals in the frequency-domain before performance of an inverse Fourier transform.

5. The method of claim 1 wherein the set of linear equations comprises an invertible matrix.

6. The method of claim 1 wherein calculating the sum and difference channel signals is performed at a receiving station after performing a discrete Fourier transform on the received preambles.

7. The method of claim 1 wherein the preambles comprise a first training field and a second training field, each training field including either the training signals or the polarity-inverted version of the training signals, each of the training signals being proceeded by a guard interval.

8. The method of claim 7 wherein training signals comprise a known training sequence modulated onto the plurality of subcarriers, wherein the training signals of each preamble have a different cyclic shift with respect to the training signals of other preambles, and wherein the cyclic-shift for each preamble is selected to have a predetermined value in the frequency-domain.

9. The method of claim 1 wherein the preambles transmitted by the transmit antennas comprise at least two repetitions.

10. The method of claim 1 wherein the channel coefficients comprise one or more coefficients for each subcarrier for each transmit-receive antenna pair, and wherein the method further comprises applying the channel coefficients to subsequently received signals to equalize the effects of the multiple-input multiple-output channel and to help separate different spatial streams transmitted by a transmitting station.

11. The method of claim 10 further comprising generating beamforming coefficients for each subcarrier from the channel coefficients for an associated subcarrier and associated transmit antenna, wherein the beamforming coefficients are applied in the frequency-domain by the transmitting station to each of the subcarriers for subsequent transmissions by the transmit antennas.

12. A multi-carrier communication station comprising:

radio-frequency circuitry to receive preambles through a multiple-input multiple-output channel through two or more receive antennas, at least one of the preambles comprising training signals and a polarity-inverted version of the training signals; and a channel estimator to calculate sum and difference channel signals for each subcarrier of a plurality of subcarriers based on the received preambles, the channel estimator to further determine channel coefficients of the multiple-input multiple-output channel from the sum and difference channel signals using a set of linear equations, wherein the channel estimator determines the sum channel signals for a first set of the subcarriers from the training signals, determines the difference channel signals for a second set of the subcarriers from the training signals, determines the sum channel signals for the second set of the subcarriers from the polarity-inverted version of the training signals, and determines the difference channel signals for the first set of the subcarriers from the polarity-inverted version of the training signals.

13. The communication station of claim 12 wherein the preambles are transmitted by two or more transmit antennas, and wherein the polarity-inverted version of the training signals is generated at a transmitting station by negating samples of the training signals prior to transmission.

14. The communication station of claim 13 wherein the polarity-inverted version of the training signals is generated at the transmitting station by negating samples of the training signals in the time-domain after performance of an inverse Fourier transform.

15. The communication station of claim 13 wherein the polarity-inverted version of the training signals is generated at the transmitting station by negating the samples of the training signals in the frequency-domain before performance of an inverse Fourier transform.

16. The communication station of claim 12 wherein the set of linear equations comprises an invertible matrix.

17. The communication station of claim 12 further comprising discrete Fourier transform circuitry to perform a discrete Fourier transform on the received preambles prior to the channel estimator determining the sum and difference channel signals.

18. The communication station of claim 12 wherein the preambles comprise a first training field and a second training field, each training field including either the training signals or the polarity-inverted version of the training signals, each of the training signals being proceeded by a guard interval.

* * * * *